(12) United States Patent
Caidar et al.

(10) Patent No.: US 10,949,891 B1
(45) Date of Patent: Mar. 16, 2021

(54) METHOD FOR PROVIDING PRODUCT-RELATED VIDEOS TO BUYERS

(71) Applicants: Allon Caidar, San Diego, CA (US); David Caidar, San Diego, CA (US)

(72) Inventors: Allon Caidar, San Diego, CA (US); David Caidar, San Diego, CA (US)

(*) Notice: Subject to any disclaimer, the term of this patent is extended or adjusted under 35 U.S.C. 154(b) by 0 days.

(21) Appl. No.: 16/556,077

(22) Filed: Aug. 29, 2019

(51) Int. Cl.
*G06Q 30/02* (2012.01)
*G06F 16/74* (2019.01)

(52) U.S. Cl.
CPC ....... *G06Q 30/0271* (2013.01); *G06F 16/743* (2019.01); *G06Q 30/0242* (2013.01); *G06Q 30/0254* (2013.01); *G06Q 30/0282* (2013.01)

(58) Field of Classification Search
USPC ........................................... 379/93.01
See application file for complete search history.

(56) References Cited

U.S. PATENT DOCUMENTS

| | | | | |
|---|---|---|---|---|
| 2008/0086356 A1* | 4/2008 | Glassman | .......... | G06Q 30/0242 705/14.41 |
| 2012/0095837 A1* | 4/2012 | Bharat | ................ | G06F 16/9535 705/14.54 |
| 2013/0204695 A1* | 8/2013 | Lee | ..................... | G06F 16/9537 705/14.45 |
| 2013/0268349 A1* | 10/2013 | Amirbekyan | ...... | G06Q 30/0244 705/14.43 |
| 2016/0239869 A1* | 8/2016 | Wong | ................. | G06Q 30/0256 |

* cited by examiner

Primary Examiner — Amal S Zenati
(74) Attorney, Agent, or Firm — Donn K. Harms

(57) ABSTRACT

A method for determining a ranking of digital video files to be sent to a respective buyer of a product previously associated with such digital video files. Using a ranking based on sales of such products after communication of a particular video file relating thereto, along with the location of the buyer and if known, the personal traits of an identified buyer, the system determines one or a plurality of video files relating to respective products to communicate to the buyer over a network which will more likely result in sale.

10 Claims, 1 Drawing Sheet

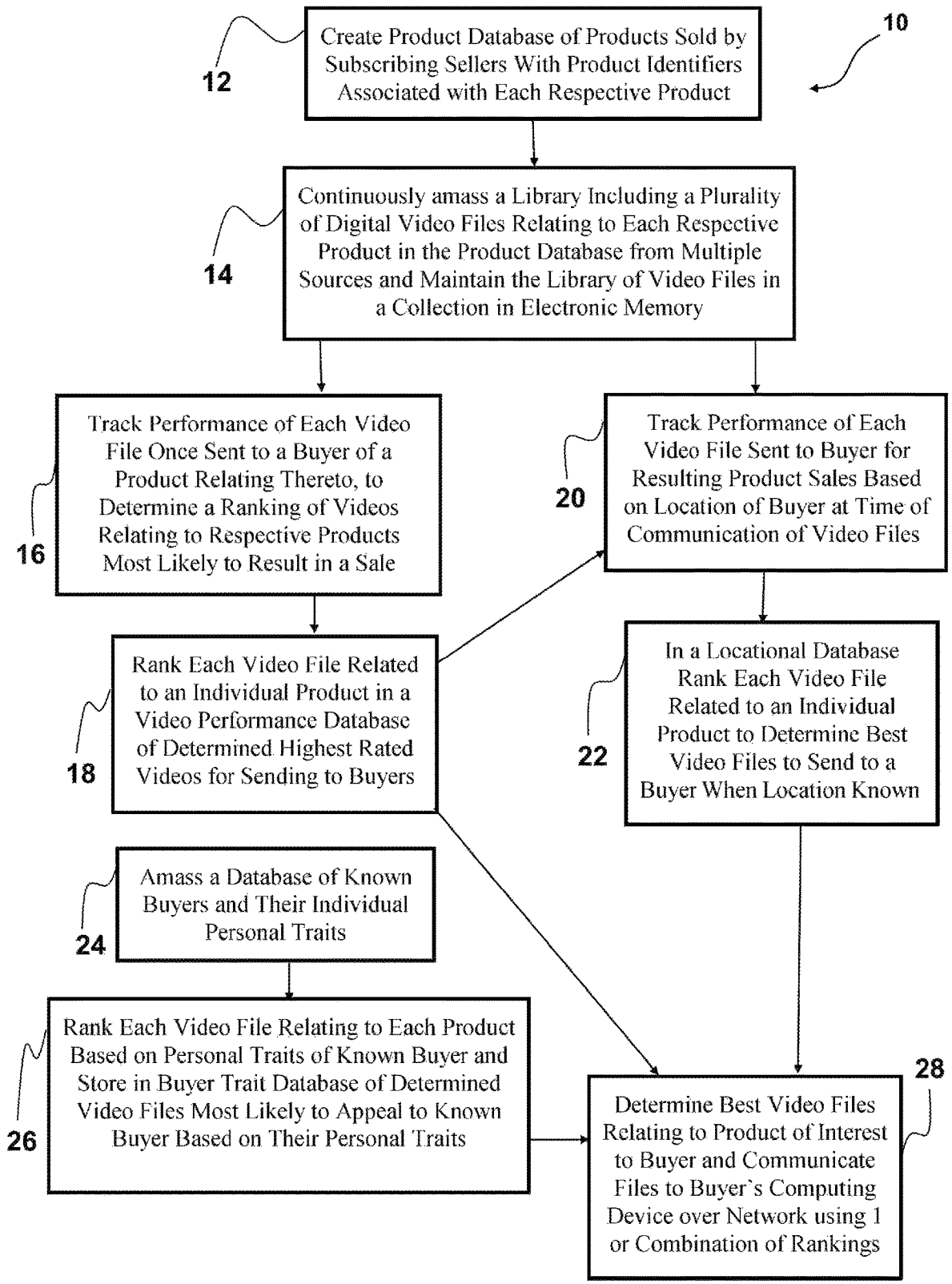

METHOD FOR PROVIDING PRODUCT-RELATED VIDEOS TO BUYERS

BACKGROUND OF THE INVENTION

1. Field of the Invention

The invention herein disclosed relates generally to the field of advertising and sales of products. More particularly it relates to a system whereby one of a plurality of videos, movies, commercials, or other remotely viewable media stored in a database as related to a particular product or service, is chosen and communicated for viewing to a user in a manner employing personal knowledge concerning the user, combined with a discerned location of the identified user at a time of communication of the chosen media.

2. Prior Art

Background of the Invention

The marketing of products through television advertisements and internet video and other streaming video to viewers, has become ever more prevalent with the maturing internet and the increasing number of internet and broadcast media channels. This visual marketing has increased exponentially with the advent of smartphones, pad computers, having video displays and audio and network bandwidth increasing for wireless connections both through WiFi and cellular networks.

In broadcast media, as well as streaming media over the internet, advertisements are conventionally broadcast during intermissions of a broadcast TV show or movie. Additionally, advertisements are viewable by users over the Internet on the video screens of computers, as well as on television screens of users having Digital Video Recorders and the like. Such advertisements with the advent of digital recording of broadcast and streaming video, are frequently skipped by the viewer since the advent of digital recording while allowing the users to time shift their viewing, also allows such viewers to fast-forward through or skip such advertisements.

Catalogs and static-photo advertising such as billboards, catalog pages, and display ads online, have been employed modernly to distribute knowledge about product lines and for advertising. In recent years with the above noted advent of broader bandwidth and devices adapted to play video and audio, the electronic pushing of media, such as video with audio concerning or relating to products and service to potential buyers has become a growth industry.

In doing so, the interest of a user who is a potential buyer of a product or service is first ascertained. This is accomplished in a number of ways, such as identifying a user in connection with a user-initiated search for a particular product or service when such a user is employing an internet search engine to gain information on the product or service. Firms such as GOOGLE make a large portion of their profits by identifying users and associating them with a current search for a product or service and selling that information. Thereafter, the user who is now identified as a potential buyer for a product or service will receive advertisements pushed to them by product and service providers.

In recent years, because of smartphones and pad computers and their ability to display video with audio tracks easily, buyers have evolved to want more than a static advertisement about a product or service. Instead, such buyers have become more responsive to media concerning the product or service of interest such as videos concerning that product or interest.

Such video may come in the form of manufacturer advertisements concerning the attributes of a particular product or service. While many buyers may respond to a video from a manufacturer in order to compare a product or service to a similar video from another manufacturer or provider, many more skeptical buyers want more. Those buyers are generally looking for video providing displayed video and audio concerning reviews of the product or service from previous buyers or from experts or afficionados in the area of the product or service.

The system herein is adapted to provide potential buyers of products and services with videos playable on a computing device such as a desktop computer, smartphone, or pad computer. However, in doing so, the system herein employs steps to ascertain what videos a particular identified potential buyer may better respond to with a purchase. Such is ascertained using acquired personal information about the buyer as to age and background, and also where they may live or work. Additionally, the system also chooses particular videos to be provided to a potential buyer based on the current location of a potential buyer, as well as based on ascertained-performance of each individual video clip to increase sales of particular products or services in a past history of such which may also include performance based on buyer location.

With respect to the above, before explaining at least one preferred embodiment of the method for providing product and service related videos to identified potential buyers herein in detail or in general, it is to be understood that the system invention is not limited in its application to the details of employment and to the arrangement of the components or the steps set forth in the following description or illustrated in the drawings. The various apparatus and methods and steps of the herein disclosed invention for providing a means to cause a user to become cognizant or informed of products and services in media for advertising and sales purposes, is capable of other embodiments, and of being practiced and carried out in various ways, all of which will be obvious to those skilled in the art once the information herein is reviewed.

Also, it is to be understood that the phraseology and terminology employed herein are for the purpose of description and should not be regarded as limiting. As such, those skilled in the art will appreciate that the conception upon which this disclosure is based may readily be utilized as a basis for other media enhancement employed as a means for causing a viewer to become cognizant of a product or service for advertising and sales thereof. It is important, therefore, that the embodiments, objects and claims herein, be regarded as including such equivalent construction and methodology insofar as they do not depart from the spirit and scope of the present invention.

SUMMARY OF THE INVENTION

The disclosed system herein, provides a method of providing informational media to identified potential buyers of a particular product or service. For ease of description herein, the word product or products also includes services for sale.

By media or video is meant herein as an electronic transmission of a display of moving pictures on the display screen of a computing device of the user which may have an audio track associated with the video which will play concurrently through the loudspeakers of the computing device of the user or buyer. Further, by associated or concerning a product or service, is meant that the communicated video or videos in some manner relate to the product or service being considered for purchase by the buyer. For example, such may include manufacturer or service provider videos which provide specifications and attributes of the product or service. As another example, such associated video may be product reviews by third parties such as from previous buyers or from experts or afficionados of the product or service. However, such should not be considered limiting in any fashion and videos associated with a product or service may be any video which shows a product or service related to that which has been ascertained to be of interest to a buyer.

The system herein will initially create a video database holding a plurality of videos where each relates to an individual product sold by subscribers. Subscribers may be manufacturers or retailers or other service providers. The video database is continuously updated and added to by constant searching of the internet for videos found to relate to individual products and by videos provided by manufacturers and retailers for the products.

In a simple mode of the system herein where a buyer may be unidentified, in a particularly preferred step, the system will create rankings for each video, which is already associated to a particular product in the videos held in memory, based on ascertained sales of the product or service relating to it. In a step performed in an ongoing basis, where a video is provided to a buyer which relates to a product of interest to that buyer, the success rate of each individual video sent, as determined in resulting in a sale to the buyer, is ascertained. From this ongoing gathered success data, a video performance database is held in memory which directly ranks the videos held in memory relating to product, in there level of success. Videos determined as most often resulting in a sale of the associated product, will be higher than non performing videos, and thereby be selected first for communication to a buyer of a respective product.

In another step, the videos can be ranked for sales performance based on the buyer location, and have that ranking stored in a video locational video database. Each video stored in memory, and associated with a respective product or service, will be ranked for sales performance when sent to a buyer, based on both a geographic location of all the buyers sent each respective video. These rankings of videos stored in memory relating to products, are stored in the video locational database. This location database associates which of the videos relating to a particular product works best to close a sale thereon, based on the current ascertained location of the buyer to which the video is communicated. Experimental research for the system herein has shown that some videos for individual products, when tracked and shown to result in a sale of the product, will work better depending on the location of the buyer at the time. In some cases, a video from those stored in memory and relating to a product, when sent to a buyer with an ascertained location at a store or venue selling the product, have been shown through tracking, to perform better than other videos for the same product held in memory. Conversely, some of the plurality of videos related to individual products, when tracked to show a sale completion, perform better when the ascertained location of the buyer to which it is sent, is not at a venue selling the product, but at home or work.

Consequently, in a preferred step in the system, the location of the known or unknown buyer requesting the video is ascertained as either a selling venue for the product, or a location remote to such a selling venue. Thereafter, the videos identified in the video locational database, from the plurality of videos held in memory relating to a product, which rank higher for the type of location identified as the whereabouts of the user, can be identified as a qualifier, as to which videos from those held in memory are provided the buyer.

Determining the geographic location of an identified or unknown individual buyer may be accomplished by ascertaining the IP address and cross referencing it for a geographical location, or by ascertaining a GPS location sent by the user device researching the product or service, or by other means as would occur to those skilled in the art.

A request for video information from any user can be provided by discerning users using a search engine to look for information about a product, or by users scanning a "QR" code on the product. For buyers who may be located at a retailing or selling venue, QR codes can be positioned on the shelves in stores and venues selling products where the QR code links to the system herein, identifies the location as a product selling venue, and using software adapted to the task, the system will request videos be sent relating to the product, which is associated with the QR code. Of course other means to determine a buyer location known in the art may be employed as would occur to those skilled in the art.

In addition to buyer location and actual video performance resulting in sales, in another mode of the system herein, each buyer may be identified, is stored in an identified buyer database. Information on each identified buyer includes personal information such as age, education, previous purchases, income, cell phone number, and other personal information which may be later employed, to identify the buyer requesting information.

Such information may be amassed by the system over time by registering buyers voluntarily who provide personal information and by tracking purchases and requests of each buyer held in the identified buyer database. Alternatively, it may be purchased or provided from providers of buyer personal information such as GOOGLE or FACEBOOK or similar companies. Further, buyer personal information can be a combination of purchase or provided buyer personal information augmented with buyer information amassed in dealing electronically with individual buyers over time.

The information in the identified buyer database, can be employed to either identify a requesting buyer using their phone number, or the Mac ID of their device, or other means. Thereafter, with the individual buyer determined, the personal information concerning each buyer can be reviewed and used in the selection of individual videos from the library held in memory associated with products, as another qualifier of which of a plurality of such videos relating to a product are to be sent to the identified requesting user.

Using historical research gathered over time, based on videos sent to know individuals with known personal traits, it can be determined which videos sent to which individuals with certain respective personal traits resulted in a sale and were thus more successful to individuals with such traits. For example, it can be determined over time that one video relating to a product sought by a buyer who is under thirty years old, worked better than an alternative video relating to the same product which was found to work best with buyers over thirty years old. From this information, a user personal trait database can be held in memory, which associates user traits to best performing product videos for buyers with such traits. Thereafter a ranking for each video held in memory in the library of electronic videos related to products, can be ascertained based on individual user traits. Using this qualifier alone or in combination with others herein, the best video or videos relating to a respective product of interest to a known user can be determined, prior to communicating a video from the plurality in memory. Of course this may be used alone, but works best when used in combination with one or more of the other qualifiers for sending videos noted herein.

With respect to the above description, before explaining at least one preferred embodiment of the method of determining and providing product related videos to buyers herein, it is to be understood that the invention is not limited in its application to the details of operation nor the arrangement of the components or the steps set forth in the following description or illustrations in the drawings. The various methods of implementation and operation of the method herein are capable of other embodiments and of being practiced and carried out in various ways which will be obvious to those skilled in the art once they review this disclosure. Also, it is to be understood that the phraseology and terminology employed herein are for the purpose of description and should not be regarded as limiting.

Therefore, those skilled in the art will appreciate that the conception upon which this disclosure is based may readily be utilized as a basis for designing of methods and systems for carrying out the several purposes of the present method. Therefore, that the objects and claims herein should be regarded as including such equivalent construction, steps, and methodology insofar as they do not depart from the spirit and scope of the present invention.

It is an object of this invention to provide a method for determining a video or videos from a plurality held in electronic memory relating to a product, which when sent to a potential product buyer, is most likely to result in a sale of the product associated with the chosen video sent.

It is a further object of this invention to provide such a method which will further differentiate the chosen most likely videos by the location and/or the known personal traits of the buyer being sent the video over a network.

These together with other objects and advantages, which become subsequently apparent reside in the details of the construction and operation of the system herein as more fully hereinafter described and claimed, reference being had to the accompanying drawings forming a part thereof, wherein like numerals refer to like parts throughout.

Further objectives of this invention will be ascertained by those skilled in the art as brought out in the following part of the specification wherein detailed description is for the purpose of fully disclosing the invention without placing limitations thereon.

BRIEF DESCRIPTION OF DRAWING FIGURE

FIG. 1 shows a flow chart of the method and system herein where the steps employed in various modes result in the communication of video to a computing device of a user which is determined most likely to result in a product sale based on sales history, buyer location, and/or known buyer personal traits.

DETAILED DESCRIPTION OF THE PREFERRED EMBODIMENTS OF THE INVENTION

Referring now to the method and system herein shown in simple format by the depictions of FIG. 1. It should be noted that in all modes of the system herein, the system provider will employ a computer or server in communication with electronic memory for and in operational communication over a network such as the internet, which is accessible for bidirectional communications with and between the computing devices of buyers. The system provider will employ one or a plurality of computing devices having electronic memory in which software adapted to perform the steps and the tasks noted herein, will run. Such electronic memory in communication with the computing device or server or the like, will also hold in accessible fashion, the identified library of videos and associated data bases herein, for use by the software adapted to access and employ such for the steps noted.

In all modes of the system herein, a user or buyer, will have a computing device having an engaged video display capable of visually depicting one or a plurality of digitized videos sent by the system provider over the network, and which preferably has loudspeakers operatively engaged to reproduce sound sent in electronic video files so receive. In the system herein, the computing device of the human buyer will be enabled with a connection to a network such as a cellular network, or Wifi, or BLUETOOTH, or other means for networked connection and communication with the system provider computer or server. Employing their personal computing device, the human buyer is sent electronically over the network, digitized video concerning a product or service of interest to the buyer. As such, the system requires a computing device with a display for each buyer, and the noted computer or server and memory to sort, associate, hold and communicate such video files over a network to the user device.

In the system 10, the system provider will create associate a product database 12 which includes identifications of individual products and services sold or provided by subscribers 12 of the system provider. Subscribers for example may be brick and mortar department stores, electronic stores, online stores, manufacturers selling direct or through physical or online stores, or other types of product and service sellers and manufacturers as would occur to those skilled in the art. The product or services sold by such subscribers will be identified uniquely such as with a alphanumeric product identifier, and held in the product database 12 with such unique product identifiers associated respectively with each such product.

In a next and continuously ongoing step in the system 10, the provider will amass an electronic video library 14 of digitized videos which are held as files electronic memory where each is also associated with the product identifier of a product or service held in the product database 12. The video library 14 may be amassed by receiving videos related to respective products from manufacturers or by searching the Internet continuously for videos which can be associated to a specific product in the product database 12.

Of course, electronic video files may already exist in the video library 14 at the time products from the product database 12 are associated with the individual videos held in the video library 14, or, if not present, such may be sought out and added to the video library 14 and associated with the product identifiers of one of the products in the product database 12. Consequently new subscribers to the system 10 may more easily join where such videos relating to their products are already stored in electronic memory in the video library 14.

As noted, such videos which are digitized and configured for holding in electronic memory, are available from product manufactures and service providers. They may also be amassed by continuously searching sources for video files on the internet which can be related using metadata therein. Alternatively, employing an audio to text transcribing program such as are widely available, electronic text of transcribed audio in such video files can be ascertained. From reading the meta data or transcribed audio of such videos, the names or identifications of individual products in an individual video from the meta tags or transcribed audio may then each be correlated or matched to a product identifier of one or more of the products held in the product database 12.

At this point in the system there are three tracks for subsequent steps which may be employed individually, or in combination, to provide a user requesting or being sent a video from the video library 14, one or more video files correlated to individual products, which when played and viewed on the buyer device, have been ascertained through previous history, as most likely to elicit a sale of the product or service to which the communicated video relates. Thus the three tracks of operation are not mutually exclusive but may be combined for better sales results, or used individually.

In a first track of the system 10 herein, shown as steps 16 and 18, a sales performance database 16, will track and continuously ascertain resulting sales of a product or service, subsequent to a video relating thereto being sent to a buyer. Such sales information can be gleaned from data communicated to the system provider by each selling subscriber to the system. Such sales information data communicated will report on actual product sales to a user, which can be based on an identity of their computing device if the user is unknown.

For example each computing device connected to a network as a unique Mac Address or Mac Id which is a burned-in unique alphanumeric identifier fixed into each network adapter when it is manufactured. Since it is readable by the system subscribers' computers, especially during online sales, and since it is also readable by the system provider when videos are sent to the device, video files relating to individual products sent to a buyer computing device, can be associated with that Mac Address on both sides.

Using sales data sent to the system provider of products purchased by buyers who were each sent videos, in a subsequent review, it can be determined which particular video files respectively relating to a particular product sent to a user, resulted in a sale of that product to that user with the identified Mac Address. Of course other electronic means exist to track sales resulting from video files sent relating to products and services and such are anticipated within the scope of this patent.

In this fashion, each respective video held in the video library 14, can be continuously ranked 18 in respective performance for culminating in a sale of the product associated with it in the product database 12. This ranking 18 will be based the step of continuously tracking the performance of each video in the library 14 relating to respective individual products, using provided sales information from selling subscribers. Using software adapted to perform the task of using the receive sales information from selling subscribers and matching the sales to known users or user devices with the individual videos from the library 14 sent those devices, top videos which resulted in the most sales can be continuously ranked 18. In this fashion, videos are continuously ranked 18 sequentially from highest correlation to a sale to lowest for their history of resulting in a sale of the individual product each video is associated with in amassing the library of digital video files 14.

Thereafter the current highest ranked videos discerned from the continuous video ranking 18 can be chosen and the determined for electronic communication to the computing devices of users seeking information concerning the associated product at later times. The ranking 18 of each video associated with a product 14 can change over time depending on the continuous tracking of the performance 16 of each video using the product sales information communicated from product selling subscribers to the system provider. Consequently where newer video files are determined to reach the highest ranking 28 they will be sent to buyers instead of a previously highest ranking video.

In another track of the system 10 of steps in communicating digital video files for display on the computing device of a buyer, the current location of the buyer may be determined using GPS or Cellular triangulation or IP address, or other means. In this fashion, the location of each buyer being sent a video amassed in the library and related to an individual product in the product database 12, is located. Of particular concern will be where it is determined the buyer is located in a store selling the product in the product database 12 to which a video in the video library 14 relates, or, the buyer is located remote such as at their home or workplace.

In this step, using the above noted tracking of performance of each video 16, as a means for determining if a video relating to a particular product which was sent to a user resulted in a sale thereof, the system 10 will track the performance 20 of each video file communicated to a buyer, based on the location of the buyer requesting it. This tracking of the performance 20 based on location, may be done as an individual step to rank performance or more preferably will be accomplished in combination with the ranking each video 18.

In this step, tracking the performance of each video file based on the location of the buyer 20 will be included in the ranking of each video 18. Thus the video files communicated to buyers include a ranking factor also based on location of the buyer, and in particular, if the buyer is in a store selling the product to which the video relates, or remote. Thereafter a locational database 22 is continuously formed and updated as to the ranking the video files for performance resulting in a sale by location 22 of the buyer receiving the video file.

Using this location ranking step, digital video files determined as better resulting in a product sale when communicated to a buyer at a store selling the product, will be prioritized and determined as the best video files 28 to be sent to buyers thereafter who are determined to be located in a store. Videos held in the location database 22 which are associated with individual products in the product database 12 and determined to provide better closing sales performance, where the buyer is located remote to a store selling the product, will be determined in such case to be the best videos to send 28, and will be sent first to such buyers in such locations.

As noted in a third track of the system shown at 24-26, the system 10 over time will continuously amass a database of known buyers 24 and associate each with a particular computing device using the Mac Identifier or other unique device identifiers which are electronically captured. For each buyer in the database of known buyers 24, their individual personal traits are also associated with each respective identified buyer. As noted above, age is a particular personal trait which has been found in experimentation to be a determiner of which video associated with an individual product in the product database 12, will be successfully.

For example users under the age of twenty five, having grown up with personal computing devices and attending school have been found to prefer individual video files which are related to respective products, which are quite different from those video files relating to a product which are communicated to a buyer of an age over twenty five.

While ages is a most preferred personal trait which will help determine from sales tracking subsequent to the communication of a video to buyers, other personal traits of personal traits such as education level, income level, geographic living area, and even the identified computing device being employed by the buyer which may be electronically captured.

With this captured, or purchased, or buyer-provided individual trait information associated with each individual known buyer known, thereafter buyer personal trait database is continuously assembled from such garnered personal traits associated to each known buyer.

Subsequently, over time, video files my be continuously ranked for inducement of a product sale, based on personal traits 26 of the know buyers. This is accomplished in the same fashion noted above by tracking successful sales to the known buyer subsequent to the communication of the individual videos from the video library 14 which are related to the product in the product database 12, which each known buyer receives from the server of the provider. Thereafter, alone or in combination with the other noted steps and tracks herein for determining the best video file relating to a product 28 to send to a requesting buyer, the best video filed can be determined 28 to be sent from the video library 14 relating to the product of interest by the buyer, may also include ranking the video file on buyer personal traits 26.

As noted the choice may be affected by the other tracks of the system such as for example where a known buyer with known buyer traits is to be sent a video file and it is determined they are in a store selling the product. The best determined video digital file 28 to communicate to a buyer, can be determined using the known buyer traits, in combination with the ranking of videos best performing in a store versus those best performing in a remote location. Of course the choice can be affected by the other rankings such as where the buyer is unknown but their location is known, or where the buyer is unknown as is their location whereupon the only choice would be sending the video based on the ranking 18 simply from past sales.

While all of the fundamental characteristics and features of the system for determining a preferred video filed to the computing device of a buyer has been shown and described herein, with reference to particular embodiments thereof, a latitude of modification, various changes and substitutions are intended in the foregoing disclosure and it will be apparent that in some instances, some features of the invention may be employed without a corresponding use of other features without departing from the scope of the invention as set forth. It should also be understood that various substitutions, modifications, and variations may be made by those skilled in the art without departing from the spirit or scope of the invention. Consequently, all such modifications and variations and substitutions are included within the scope of the invention as defined by the following claims.

What is claimed is:

1. A method for communicating product-related digital videos to buyers, comprising:

creating a database of physical products sold by individual sellers and associating a product identifier with each respective said physical product;

searching the Internet and continuously amassing a library of digital video files found thereon and relating a plurality of said digital video files to a respective physical product in said database of physical products;

communicating one or more of said plurality of digital video files relating to a said physical product to a computing device of a buyer which is in communication with an online sales site of a respective one of said individual sellers, for depiction on a display of said computing device of said buyer;

using sales data of confirmed sales of said physical products to said buyers to whom said one or more of said plurality of digital video files relating to respective said physical products have been communicated, to determine a ranking of said plurality of said digital video files relating to respective said physical products;

continuously determining the best of said plurality of digital files relating to a respective physical product to communicate to buyers thereof, by selecting those digital video files highest in said ranking; and sending said best of said plurality of said digital video files relating to a respective physical product to buyers subsequently interested in buying said respective physical product.

2. The method for communicating product-related digital videos to buyers of claim 1, further comprising:

determining if said buyer having said computing device which is in communication with said online sales site, is located within a store operated by said one of said individual sellers, or is located remote to said store operated by said one of said individual sellers;

determining a ranking of said digital video files communicated to said buyers located in a store selling said physical product relating to said digital video files communicated to said buyers, based on which of said digital video files communicated results in the most sales of said physical products to said buyers located in said store;

determining a ranking of said digital video files communicated to buyers during a said visit to said online sales site who are located remote to any store selling said physical product relating to said digital video files communicated to said buyers during said visit to said online sales site, based on which of said digital video files so communicated results in the most sales of said physical products to said buyers located remote to said store;

determining if subsequent buyers for said physical products are located in a said store, or are located remote to said store;

communicating to subsequent said buyers determined located in a store, said video digital files having a highest said ranking of said digital video files communicated to buyers in a store;

communicating to subsequent said buyers determined located remote to a store, said video digital files having a highest said ranking of said digital video files communicated to buyers located remote to a store.

3. The method for communicating product-related digital videos to buyers of claim 1, further comprising:

compiling a database of said buyers who are known buyers, and associating each of said known buyers with individual buyer traits;

ranking said digital video files communicated to buyers to determine a ranking of said digital video files based on which of said video files results in sales of said physical product related thereto based on said individual buyer traits; and for subsequent communications of digital video files relating to physical products of interest to known buyers, communicating those respective digital video files with the highest said ranking for the known traits associated with said known buyers.

4. The method for communicating product-related digital videos to buyers of claim 2, further comprising:

compiling a database of said buyers who are known buyers, and associating each of said known buyers with individual buyer traits;

ranking said digital video files communicated to buyers to determine a ranking of said digital video files based on which of said video files results in sales of said physical product related thereto based on said individual buyer traits; and for subsequent communications of digital video files relating to physical products of interest to known buyers, communicating those respective digital video files with the highest said ranking for the known traits associated with said known buyers.

5. A method for communicating product-related digital videos to buyers, comprising:

creating a database of products sold by individual sellers and associating a product identifier with each respective product;

amassing a library of digital video files and relating a plurality of said digital video files to a respective product in said database of products;

communicating one or more of said plurality of digital video files relating to a said product to a computing device of a buyer having said computing device in communication with an online sales site of a respective said seller, for depiction on a display of said computing device;

using sales data of confirmed sales to determine a ranking of said plurality of said digital video files relating to respective said products;

continuously determining the best of said plurality of digital files relating to a respective product to communicate to buyers thereof, by selecting those digital video files highest in said ranking; and sending said best of said plurality of said digital video files relating to a respective product to buyers interested in buying said respective product.

6. The method for communicating product-related digital videos to buyers of claim 5, further comprising:

determining if said buyer communicating with said online sales site, is located within a store operated by said one of said individual sellers, or, if said buyer is located remote to said store operated by said one of said individual sellers;

determining a ranking of said digital video files communicated to buyers located in a said store selling said product relating to said digital video files communicated to said buyers, based on which of said digital video files communicated results in the most sales of said products to said buyers located in said store;

determining a ranking of said digital video files communicated to buyers located remote to any store selling said product relating to said digital video files communicated to said buyers, based on which of said digital video files communicated results in the most sales of said products to said buyers located remote to said store;

determining if subsequent buyers for said products are located in a said store operated by one of said individual sellers, or are located remote to said store;

communicating to subsequent said buyers determined located in a store, said video digital files having a highest said ranking of said digital video files communicated to buyers in a store;

communicating to subsequent said buyers determined located remote to a store, said video digital files having a highest said ranking of said digital video files communicated to buyers located remote to a store.

7. The method for communicating product-related digital videos to buyers of claim 5, further comprising:

compiling a database of said buyers who are known buyers, and associating each of said known buyers with individual buyer traits;

ranking said digital video files communicated to buyers to determine a ranking of said digital video files based on which of said video files results in sales of said product related thereto based on said individual buyer traits; and for subsequent communications of digital video files relating to products of interest to known buyers, communicating those respective digital video files with the highest said ranking for the known traits associated with said known buyers.

8. The method for communicating product-related digital videos to buyers of claim 6, further comprising:

compiling a database of said buyers who are known buyers, and associating each of said known buyers with individual buyer traits;

ranking said digital video files communicated to buyers to determine a ranking of said digital video files based on which of said video files results in sales of said product related thereto based on said individual buyer traits; and for subsequent communications of digital video files relating to products of interest to known buyers, communicating those respective digital video files with the highest said ranking for the known traits associated with said known buyers.

9. The method for communicating product-related digital videos to buyers of claim 5, wherein the product is a physical product or service.

10. The method for communicating product-related digital videos to buyers of claim 5, wherein the computing device includes a desktop computer, smartphone, or pad computer.

\* \* \* \* \*